United States Patent [19]

Ishiwata

[11] Patent Number: 4,508,792
[45] Date of Patent: Apr. 2, 1985

[54] ELECTROCHROMIC ELEMENT

[75] Inventor: Kazuya Ishiwata, Yokosuka, Japan

[73] Assignee: Canon Kabushiki Kaisha, Tokyo, Japan

[21] Appl. No.: 549,427

[22] Filed: Nov. 7, 1983

[30] Foreign Application Priority Data

Nov. 16, 1982 [JP] Japan .................. 57-200911

[51] Int. Cl.$^3$ ............................. B41M 5/20
[52] U.S. Cl. ........................ 428/702; 204/2; 346/200; 427/38; 428/913
[58] Field of Search ............ 346/200, 202, 211; 428/209, 913, 457, 469, 689, 702; 204/2; 427/38-41

[56] References Cited

FOREIGN PATENT DOCUMENTS 0046569 4/1979 Japan .................. 346/211
0046571 4/1979 Japan .................. 346/211
0111360 8/1979 Japan .................. 346/202

Primary Examiner—Bruce H. Hess
Attorney, Agent, or Firm—Fitzpatrick, Cella, Harper & Scinto

[57] ABSTRACT

An electrochromic element comprises an electrochromic layer between a pair of electrode plates, and it is characterized in that the electrochromic layer is a coat formed by the ion plating of cobalt oxide in the presence of oxygen gas and/or water vapor.

7 Claims, 3 Drawing Figures

ELECTROCHROMIC ELEMENT

BACKGROUND OF THE INVENTION

1. Field of the Invention

This invention relates to an element utilizing an electrochemical color-forming and color-quenching phenomenon, that is, the electrochromic effect, and more particularly to an elemental device having a novel electrochromic layer, which can form a color, on the anode side.

2. Description of the Prior Art

A conventional electrochromic element has been produced by forming an insulating layer and a coating film as a color-forming layer at the cathode side between a pair of electrode plates. The coating film is made of tungsten dioxide ($WO_2$), tungsten trioxide ($WO_3$), molybdenum dioxide ($MoO_2$), molybdenum trioxide ($MoO_3$), divanadium pentoxide ($V_2O_5$), or the like. Further, it has been proposed to use, as a color-forming layer at the anode side, a coat made of iridium hydroxide ($Ir(OH)_2$), nickel hydroxide ($Ni(OH)_2$), or chromium trioxide ($Cr_2O_3$), alone or in combination with the above cathode-side color-forming layer.

These entirely solid electrochromic elements of the prior art generally have the problems of low response speed, poor color-forming effect, particularly low density of color formed, and short service life, and may have still other problems. These problems are significant objections to practical applications of electrochromic elements.

SUMMARY OF THE INVENTION

A primary object of this invention is to provide an electrochromic element which solves the above-mentioned problems.

Another object of this invention is to provide an electrochromic element which is improved in the speed of response, color-forming effect and service life.

According to an aspect of this invention, there is provided an electrochromic element comprising an electrochromic layer between a pair of electrode plates, characterized in that the electrochromic layer is a coat formed by the ion plating of cobalt oxide in the presence of oxygen gas and/or water vapor.

According to another aspect of this invention, there is provided an electrochromic element comprising a cathode-side color-forming layer and an anode-side color-forming layer between a pair of electrode plates, characterized in that the anode-side color-forming layer is a coat formed by the ion plating of cobalt oxide in the presence of oxygen gas and/or water vapor.

DETAILED DESCRIPTION OF PREFERRED EMBODIMENTS

Figure 1:
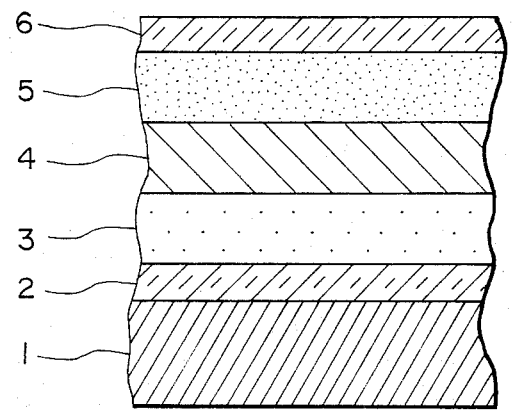
FIGS. 1 and 2 are cross-sectional views of electrochromic elements of this invention.

Referring now to the drawings, this invention is described in detail.

Figure 2:
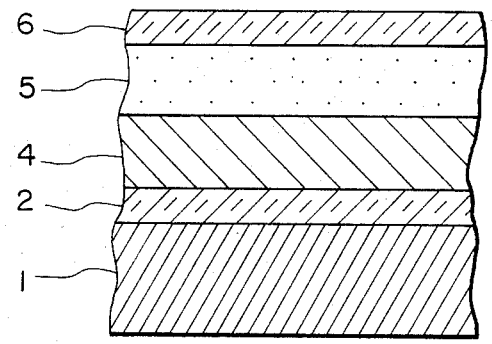

In FIGS. 1 and 2, which are cross-sectional views of electrochromic elements of this invention, numeral 1 is a substrate consisting of a glass plate or the like, 2 is a first electrode consisting of a transparent conductive film or a metallic film such as Au, Al, Ni, Cr, Ag, etc., 3 is a first electrochromic layer as a cathode-side color-forming layer, 4 is an insulating layer consisting of a dielectric substance, 5 is a second electrochromic layer as an anode-side color-forming layer, and 6 is a second electrode consisting of a conductive film.

The substrate is not limited to the glass plate, but any colorless transparent plate made of, for example, a plastic plate such as an acrylic resin plate may be used as the substrate. The element may have such a substrate on either side of one of the electrodes, or on both sides of the electrodes. The second electrode 6 may be transparent or not; when it is transparent, the element can be utilized as a transparent type electrochromic device. Such a transparent conductive film may include an ITO film, which is an indium oxide ($In_2O_3$) film containing about 5% by weight of tin oxide ($SnO_2$), an Nesa film, and so forth. The first electrochromic layer 3 serving as a cathode-side color-forming layer may be a coat made of tungsten dioxide ($WO_2$), tungsten trioxide ($WO_3$), molybdenum dioxide ($MoO_2$), molybdenum trioxide ($MoO_3$), or divanadium pentoxide ($V_2O_5$). The insulating layer 4 of dielectric substance may be a coat made of an oxide represented by zirconium dioxide ($ZrO_2$), silicon monoxide ($SiO$), silicon dioxide ($SiO_2$) and ditantalum pentoxide ($Ta_2O_5$), or a fluoride represented by magnesium fluoride ($MgF_2$).

The second electrochromic layer 5 serving as an anode-side color-forming layer is a coat which may be formed by the ion plating method using cobalt oxides such as $CoO$ and $Co_2O_3$ alone or in combination in the presence of oxygen ($O_2$) gas and/or water vapor ($H_2O$ gas). In this case, oxygen gas and/or water vapor is desirably introduced into an ion plating vacuum chamber evacuated to about $10^{-6}$ Torr, to give a pressure of approximately $2.0 \times 10^{-4} - 5.0 \times 10^{-4}$ Torr. Suitable deposition rates of the cobalt compound are 0.6–2.0 Å/sec. The resulting coat, which is formed by the ion plating of the cobalt oxide in the presence of oxygen gas and/or water vapor, is assumed to consist of cobalt oxide, cobalt hydroxide ($Co(OH)_2$) or a mixture thereof.

In this invention, the cathode-side color-forming layer 3 shown in FIG. 1 can be omitted as shown in FIG. 2, where the resulting electrochromic element also is improved in the speed of response, color-forming effect, and service life, as compared with the prior art elements.

Figure 3:
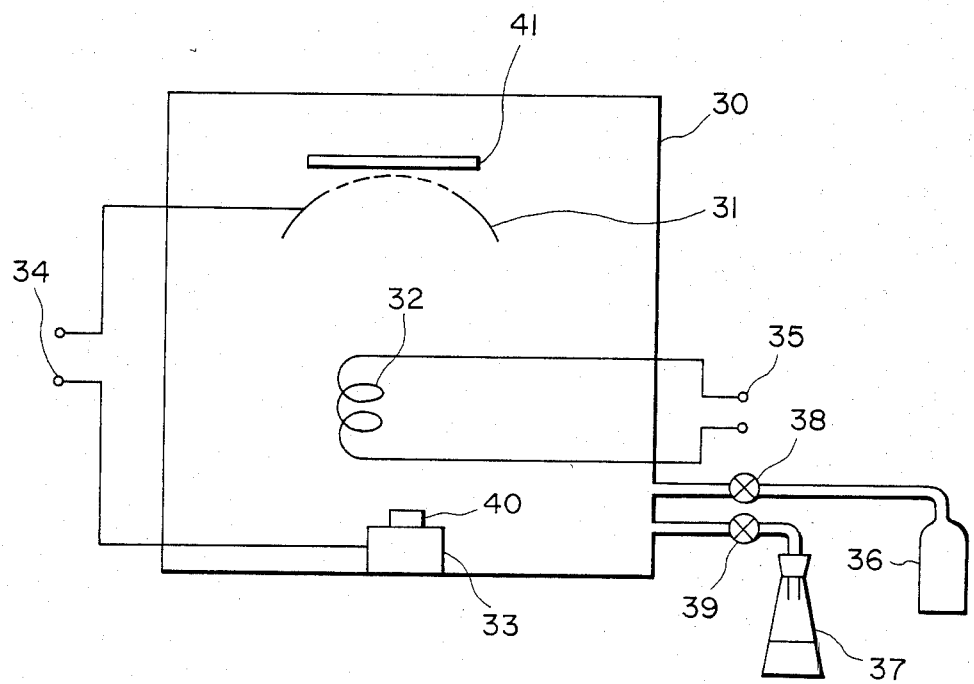
FIG. 3 is a schematic illustration of an ion plating apparatus for preparing the electrochromic element of this invention.

The ion plating apparatus used in this invention comprises, as shown in FIG. 3, a vacuum chamber 30 wherein a support 31, high-frequency coil 32 and electron gun 33 are arranged. A power source 34 for applying a d.c. bias between the support 31 and the electron gun 33, and a high-frequency power source 35 for supplying high-frequency power to the high-frequency coil 32 are arranged outside the vacuum chamber 30. An oxygen gas bomb 36 and a water-containing vessel 37 are connected through needle valves 38 and 39, respectively, to the vacuum chamber 30 so as to feed oxygen gas and/or water vapor into the chamber 30. The formation of the second electrochromic layer 5 can be accomplished by the ion plating method, more particularly, by setting cobalt oxide 40 on the electron gun 33 and an object 41 to be coated (such as an electrode plate) on the support 31. The ion plating may be carried out preferably by applying a d.c. bias of 0.2–3.6 KV and a 13.56 MHz high-frequency power.

The entirely solid electrochromic element thus prepared, on applying a prescribed voltage between the first and second electrodes to cause an electrochemical reation, displays a color image, which disappears on applying the counter voltage.

The "anode-side color-forming layer" or "color-forming layer at the anode side" herein used means a layer capable of forming a color when an adjacent electrode (only sufficient to be in electrical connection with the layer) is connected with the positive (+) side and electric current is passed between the anode and cathode. Further, the "cathode-side color-forming layer" or "color-forming layer at the cathode side" means a layer capable of forming a color when an adjacent electrode (only sufficient to be electrical connection with the layer) is connected with the negative (−) side and electric current is passed between the anode and cathode.

This invention is illustrated further referring to the following Examples.

EXAMPLE 1

An ITO film, formed as the second electrode on a Corning 7059 (Corning Grass Co., U.S.A.) glass substrate of 0.8 mm thickness, was coated with a second electrochromic layer of 1500 Å thickness which is the anode-side color-forming layer, by the reactive ion plating method employing the apparatus as shown in FIG. 3. The ion plating was conducted by introducing water vapor into the vacuum chamber to a pressure of $5.0 \times 10^{-4}$ Torr and vaporizing CoO previously set in the chamber. At that time, the deposition rate was controlled to 2.0 Å/sec. Further, this electrochromic layer was overlaid with a $Ta_2O_5$ film of 3000 Å thickness as an insulating layer and then with a $WO_3$ layer of 3000 Å thickness as a first electrochromic layer which is the cathode-side color-forming layer, both layers being formed by the vacuum deposition at a vacuum degree of $2.0 \times 10^{-5}$ Torr and a deposition rate of 10 Å/sec. Then, a translucent conductive Au film of 300 Å was formed as the first electrode on the $WO_3$ electrochromic layer.

The entirely solid electrochromic element formed a color on applying a d.c. voltage of 2.0 V between the first electrode in contact with the cathode-side color-forming layer and the second electrode in contact with the anode-side color-forming layer. At that time, the first electrode was connected with the cathode while the second electrode was connected with the anode. As a result, it took 500 m sec. until the optical density rise ($\Delta$O.D.) reached a value of 0.3. Further, when application of the voltage was discontinued, the colored state was maintained as such. Thereafter, when the polariies of the electrodes at the time of color formation were reversed, the colored state turned into the colorless state.

EXAMPLE 2

An ITO film formed as the second electrode on a Corning 7059 glass substrate of 0.8 mm thickness, was coated with a second electrochromic layer of 1500 Å thickness which is the anode-side color-forming layer, by the reactive ion plating at a vapor deposition rate of 2.0 Å/sec. This plating was conducted by using the apparatus illustrated in FIG. 3, more particularly by introducing water vapor into the vacuum chamber to a pressure of $3.0 \times 10^{-4}$ Torr and then oxygen gas to a pressure of $5.0 \times 10^{-4}$ Torr and vaporizing CoO previously set in the chamber. Further, this electrochromic layer was overlaid with a $Ta_2O_5$ insulating layer of 3000 Å thickness and then with a $WO_3$ layer of 3000 Å thickness as a first electrochromic layer which is the cathode-side color-forming layer, both layers being formed by vapor deposition at a vacuum degree of $2.0 \times 10^{-5}$ Torr and a vapor deposition rate of 10 Å/sec. Then, a translucent conductive Au film of 300 Å thickness was formed as the first electrode on the $WO_3$ electrochromic layer.

The thus prepared electrochromic element was operated by applying a d.c. voltage of 2.0 V between the first and second electrodes in the same manner as in Example 1. As a result, it took 600 m sec. until the optical density rise $\Delta$O.D. reached a value of 0.3.

EXAMPLE 3

An ITO film, formed as the second electrode on a Corning 7059 glass substrate of 0.8 mm thickness was coated with a second electrochromic layer of 1500 Å thickness which is the anode-side color-forming layer, by the reactive ion plating at a vapor deposition rate of 3.0 Å/sec. This plating was conducted by using the apparatus illustrated in FIG. 3, more particularly by introducing water vapor into the vacuum chamber to a pressure of $5.0 \times 10^{-4}$ Torr, and vaporizing $Co_2O_3$ previously set in the chamber. Further, this electrochromic layer was overlaid with a $Ta_2O_3$ insulating layer of 3000 Å thickness and then with a $WO_3$ layer of 3000 Å thickness as a first electrochromic layer, which is the cathode-side color-forming layer, both layers being formed by vacuum deposition at a vacuum degree of $2.0 \times 10^{-5}$ Torr and vapor deposition rate of 10 Å/sec. Then, a translucent conductive Au film of 300 Å thickness was formed as the first electrode on the $WO_3$ electrochromic layer.

The thus prepared electrochromic element was operated by applying a d.c. voltage of 2.0 V between the first and second electrodes, in the same manner as in Example 1. As a result, it took 480 msec. until the optical density rise $\Delta$O.D. reached a value of 0.3.

EXAMPLE 4

An ITO film, formed as the second electrode on a Corning 7059 glass substrate of 0.8 mm thickness, was coated with a second electrochromic layer of 1500 Å thickness which is the anode-side color-forming layer, by the reactive ion plating at a vapor deposition rate of 3.0 Å/sec. This plating was conducted by using the apparatus illustrated in FIG. 3, more particularly by introducing water vapor into the vacuum chamber to a pressure of $3.0 \times 10^{-4}$ Torr and then oxygen gas to a pressure of $5.0 \times 10^{-4}$ Torr and vaporizing $Co_2O_3$ previously set in the chamber. Further, this electrochromic layer was overlaid with a $Ta_2O_5$ insulating layer of 3000 Å thickness and then with a $WO_3$ layer of 3000 Å thickness as a first electrochromic layer which is the cathode-side color-forming layer, both layers being formed by vacuum deposition at a vacuum degree of $2.0 \times 10^{-5}$ Torr and a vapor deposition rate of 10 Å/sec. Then, a translucent conductive Au film of 300 Å thickness was formed as the first electrode on the $WO_3$ electrochromic layer.

The thus prepared electrochromic element was operated by applying a d.c. voltage of 2.0 V between the first and second electrodes in the same manner as in Example 1. As a result, it took 700 m sec. until the optical density rise $\Delta$ O.D. reached a value of 0.3.

EXAMPLE 5

An ITO film formed as the second electrode on a Corning 7059 glass substrate of 0.8 mm thickness, was coated with a second electrochromic layer of 1500 Å thickness which is the anode-side color-forming layer, by the reactive ion plating at a vapor deposition rate of 4.0 Å/sec. This plating was conducted by using the apparatus illustrated in FIG. 3, more particularly by introducing oxygen gas into the vacuum chamber to a pressure of $5.0 \times 10^{-4}$ Torr, and vaporizing CoO previously set in the chamber. Further, this electrochromic layer was overlaid with a $Ta_2O_5$ insulating layer of 3000 Å thickness and then with a $WO_3$ layer of 3000 Å thickness as a first electrochromic layer, which is the cathode-side color-forming layer, both layers being formed by vacuum deposition at a vacuum degree of $2.0 \times 10^{-5}$ Torr and a vapor deposition rate of 10 Å/sec. Then, a translucent conductive Au film of 300 Å thickness was formed as the first electrode on the $WO_3$ electrochromic layer.

The thus prepared electrochromic element was operated by applying a d.c. voltage of 2.0 V between the first and second electrodes, in the same manner as in Example 1. As a result, it took 600 m sec. until the optical density rise $\Delta O.D.$ reached a value of 0.3.

EXAMPLE 6

An ITO film, formed as the second electrode on a Corning 7059 glass substrate of 0.8 mm thickness was coated with a second electrochromic layer of 1500 Å thickness which is the anode-side color-forming layer, by the reactive ion plating at a vapor deposition rate of 4.0 Å/sec. This plating was conducted by using the apparatus illustrated in FIG. 3, introducing oxygen gas into the vacuum chamber to a pressure of $5.0 \times 10^{-4}$ Torr, and vaporizing $Co_2O_3$ previously set in the chamber. Further, this electrochromic layer was overlaid with a $Ta_2O_5$ insulating layer of 3000 Å thickness as the first electrochromic layer which is the cathode-side color-forming layer, both layers being formed by vacuum deposition at a vacuum degree of $2.0 \times 10^{-5}$ Torr and vapor deposition rate of 10 Å/sec. Then, a translucent conductive Au film of 300 Å thickness was formed as the first electrode on the $WO_3$ electrochromic layer.

The thus prepared electrochromic element was operated by applying a d.c. voltage of 2.0 V between the first and second electrodes in the same manner as in Example 1. As a result, it took 700 m sec. until the optical density rise $\Delta O.D.$ reached a value of 0.2.

EXAMPLE 7

An ITO film, formed as the second electrode on a Corning 7059 glass substrate of 0.8 mm thickness was coated with a second electrochromic layer of 1500 Å thickness which is the anode-side color-forming layer, by the reactive ion plating at a vapor deposition rate of 3.0 Å/sec. This plating was conducted by using the apparatus illustrated in FIG. 3, introducing water vapor to the vacuum to a pressure of $3.0 \times 10^{-4}$ Torr and then oxygen gas to a pressure of $5.0 \times 10^{-4}$ Torr, and vaporizing $Co_2O_3$ previously set in the chamber. Further, this electrochromic layer was overlaid with a $Ta_2O_5$ insulating film of 3000 Å thickness by vacuum deposition at a vacuum degree of $2.0 \times 10^{-5}$ Torr and vapor deposition rate of 10 Å/sec. Then, a translucent conductive Au film of 300 Å thickness was formed as the first electrode on the insulating layer.

The thus prepared electrochromic element was operated by applying a d.c. voltage of 2.0 V between the first and second electrodes in the same manner as in Example 1. As a result, it took 800 m sec. until the optical density rise $\Delta O.D.$ reached a value of 0.3.

EXAMPLE 8

An ITO film, formed as the second electrode on a Corning 7059 glass substrate of 0.8 mm thickness, was coated with a second electrochromic layer of 1500 Å thickness which is the anode-side color-forming layer, by the reactive ion plating at a vapor deposition rate of 4.0 Å/sec. This plating was conducted by using the apparatus illustrated in FIG. 3, more particularly by introducing oxygen gas into the vacuum chamber to a pressure of $5.0 \times 10^{-4}$ Torr, and vaporizing $Co_2O_3$ previously set in the chamber. Further, this electrochromic layer was overlaid with a $Ta_2O_3$ insulating layer of 3000 Å thickness of vacuum deposition at a vacuum degree of $2.0 \times 10^{-5}$ Torr and a vapor deposition rate of 10 Å/sec. Then, a translucent conductive Au film of 300 Å thickness was formed as the first electrode on the insulating layer.

The thus prepared electrochromic element was operated by applying a d.c. voltage of 2.0 V between the first and second electrodes in the same manner as in Example 1. As a result, it took 800 m sec. until the optical density rise $\Delta O.D.$ reached a value of 0.2.

What I claim is:

1. An electrochromic element comprising an electrochromic layer disposed between a pair of electrode plates, characterized in that the electrochromic layer is a coat formed by the ion plating of cobalt oxide in the presence of at least one of oxygen gas and/or water vapor.

2. An electrochromic element according to claim 1, wherein the cobalt oxide is selected from the group consisting of CoO, $Co_2O_3$ and a combination thereof.

3. An electrochromic element comprising a cathode-side color-forming layer and an anode-side color-forming layer disposed between a pair of electrode plates, characterized in that the anode-side color-forming layer is a coat formed by the ion plating of cobalt oxide in the presence of at least one of oxygen gas and/or water vapor.

4. An electrochromic element according to claim 3, wherein the cobalt oxide is selected from the group consisting of CoO, $Co_2O_3$ and a combination thereof.

5. An electrochromic element according to claim 3, further comprising an insulating layer between the cathode-side color-forming layer and anode-side color-forming layer.

6. An electrochromic element according to claim 5, wherein the insulating layer is a film of at least one dielectric substance selected from the group consisting of zirconium dioxide, silicon monoxide, silicon dioxide, ditantalum pentoxide and magnesium fluoride.

7. An electrochromic element according to claim 3, wherein the cathode-side color-forming layer is a coat of at least one metal oxide selected from the group consisting of tungsten dioxide, tungsten trioxide, molybdenum dioxide, molybdenum trioxide and divanadium pentoxide.

* * * * *

UNITED STATES PATENT AND TRADEMARK OFFICE
CERTIFICATE OF CORRECTION

PATENT NO. : 4,508,792
DATED : April 2, 1985
INVENTOR(S) : KAZUYA ISHIWATA

It is certified that error appears in the above-identified patent and that said Letters Patent is hereby corrected as shown below:

Column 3, line 4, change "reation" to --reaction--;

line 23, change "Grass" to --Glass--.

Column 6, line 36, after "and" delete "/or";

line 46, after "and" delete "/or".

Signed and Sealed this

Fifteenth Day of April 1986

[SEAL]

Attest:

DONALD J. QUIGG

Attesting Officer     Commissioner of Patents and Trademarks